(12) United States Patent
Momeni

(10) Patent No.: US 10,656,722 B2
(45) Date of Patent: May 19, 2020

(54) SENSOR SYSTEM FOR COLLECTING GESTURAL DATA IN TWO-DIMENSIONAL ANIMATION

(71) Applicant: Ali Momeni, Pittsburgh, PA (US)

(72) Inventor: Ali Momeni, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 0 days.

(21) Appl. No.: 15/774,674

(22) PCT Filed: Nov. 9, 2016

(86) PCT No.: PCT/US2016/061186
§ 371 (c)(1),
(2) Date: May 9, 2018

(87) PCT Pub. No.: WO2017/083422
PCT Pub. Date: May 18, 2017

(65) Prior Publication Data
US 2018/0329503 A1 Nov. 15, 2018

Related U.S. Application Data

(60) Provisional application No. 62/285,815, filed on Nov. 9, 2015.

(51) Int. Cl.
*G09G 5/00* (2006.01)
*G06F 3/01* (2006.01)
(Continued)

(52) U.S. Cl.
CPC .......... *G06F 3/017* (2013.01); *G06F 3/04845* (2013.01); *G06K 9/00355* (2013.01);
(Continued)

(58) Field of Classification Search
CPC ........ G06F 3/01; G06F 3/017; G06F 3/04845; G06K 9/00201; G06K 9/00335;
(Continued)

(56) References Cited

U.S. PATENT DOCUMENTS 8,988,422 B1 * 3/2015 Hodgins ................. G06T 13/80
345/419
2002/0101422 A1 8/2002 Rosenfeld
(Continued)

FOREIGN PATENT DOCUMENTS

WO WO2017/083422 5/2017

OTHER PUBLICATIONS http://openframeworks.cc downloaded Dec. 14, 2018, pp. 1-2.
(Continued)

*Primary Examiner* — Joe H Cheng
(74) *Attorney, Agent, or Firm* — Fish & Richardson P.C.

(57) ABSTRACT

This document describes a system for animating a two-dimensional object in real-time with gestural data collected by a gestural sensor of the system. A gestural sensor collects gestural data. An image extraction engine extracts image data that renders a two-dimensional object on a display device of the system. An overlay engine generates a mesh overlay for the two-dimensional object. Based on a detected gesture represented in the gestural data collected, an animation engine modifies portions of the two-dimensional object from a first image frame to a second image frame based on the collected gestural data. An image frame generator generates the first and second image frames that animate the two-dimensional object in accordance with the gestural data collected.

27 Claims, 5 Drawing Sheets

(51) Int. Cl.
*G06K 9/46* (2006.01)
*G06F 3/0484* (2013.01)
*G06K 9/00* (2006.01)
*G06T 13/80* (2011.01)
*G06T 7/136* (2017.01)
*G06T 7/593* (2017.01)

(52) U.S. Cl.
CPC ............... *G06K 9/46* (2013.01); *G06T 13/80* (2013.01); *G06T 7/136* (2017.01); *G06T 7/593* (2017.01)

(58) Field of Classification Search
CPC ...... G06K 9/00355; G06K 9/46; G06T 13/40; G06T 13/80; G06T 17/00; A63F 13/213
See application file for complete search history.

(56) References Cited

U.S. PATENT DOCUMENTS

| | | | |
|---|---|---|---|
| 2007/0146325 A1* | 6/2007 | Poston | G06F 3/0317 345/163 |
| 2008/0309664 A1 | 12/2008 | Zhou et al. | |
| 2010/0141663 A1 | 6/2010 | Becker et al. | |
| 2010/0302247 A1 | 12/2010 | Perez et al. | |
| 2011/0025689 A1 | 2/2011 | Perez et al. | |
| 2011/0134119 A1* | 6/2011 | Airey | G06T 13/00 345/423 |
| 2013/0050076 A1 | 2/2013 | Hong et al. | |
| 2013/0127874 A1 | 5/2013 | Peterson | |
| 2013/0187929 A1 | 7/2013 | Perez et al. | |
| 2014/0297092 A1 | 10/2014 | Delp | |
| 2015/0040074 A1 | 2/2015 | Hofmann et al. | |
| 2015/0154782 A1 | 6/2015 | Geisner et al. | |
| 2015/0371447 A1* | 12/2015 | Yasutake | G06T 19/006 345/420 |
| 2016/0140766 A1* | 5/2016 | Balachandreswaran | G06T 19/006 345/633 |
| 2017/0091976 A1* | 3/2017 | O'Sullivan | G11B 27/00 |

OTHER PUBLICATIONS http://www.ofxaddons.com/categories, downloaded Dec. 14, 2018, pp. 1-678.

Burtnyk, N., & Wein, M. (1976). Interactive skeleton techniques for enhancing motion dynamics in key frame animation. Communications of the ACM, 19(10):564-569 (1976).

Igarashi, T., Moscovich, T., & Hughes, J. F. (2005). As-rigid-as-possible shape manipulation. ACM Transactions on Graphics , 24 (3), 1134-1141.

Multon, F., France, L., Cani-Gascuel, M. P., & Debunne, G. (1999). Computer animation of human walking: a survey. Journal of Visualization and Computer Animation , 10 (1), 1-37.

Tomlinson, B., "From Linear to Interactive Animation: How Autonomous Characters Change the Process and Product of Animating," Computers in Entertainment, 3 (1), 5, pp. 1-20 (2005).

Tost, D., & Pueyo, X. (1988). Human body animation: a survey. The Visual Computer, 3 (5), 254-264.

ISA/U, International Search Report for PCT/US2016/061186 (Jan. 6, 2017).

* cited by examiner

SENSOR SYSTEM FOR COLLECTING GESTURAL DATA IN TWO-DIMENSIONAL ANIMATION

CROSS REFERENCE TO RELATED APPLICATIONS

This application is a § 371 National Stage Application of PCT/US2016/061186, filed on Nov. 9, 2016, which, in turn, claims the benefit of priority under 35 U.S.C. § 119(e) to U.S. Provisional Patent Application No. 62/285,815, filed on Nov. 9, 2015, the entire contents of each of which are hereby incorporated by reference.

CLAIM OF PRIORITY

This application claims priority under 35 USC § 119(e) to U.S. Patent Application Ser. No. 62/285,815, filed on Nov. 9, 2015, the entire contents of which are hereby incorporated by reference.

BACKGROUND

Many animation approaches use key frames that define the starting point and ending point of a smooth transition. An animator can use a number of key frames to indicate how an animation will occur, and fill in intermediate frames with in-between frames. This can be a laborious and time-intensive process. In some cases, software is used to assist in generating in-between images.

SUMMARY

This document describes gestural rigging and control of animation. More specifically, the present invention relates to a rapid real-time gestural rigging and control of animation using a gestural sensor connected to an animation engine.

This document describes a gestural sensor that collects gestural data; an image extraction engine for extracting image data that renders a two-dimensional object on a display device of the system; an overlay engine for generating a mesh overlay for the two-dimensional object, the mesh overlay comprising a number of selectable zones that correspond to portions of the two-dimensional object and for mapping a selectable zone to a portion of the two-dimensional object based on a detected gesture represented in the gestural data collected; an animation engine for applying a set of rules to at least portion of the extracted image data that represents the portion of the two-dimensional object that is mapped to the selectable zone, the set of rules defining an amount of modification to one or more portions of the two-dimensional object from a first image frame to a second image frame based on the collected gestural data; and an image frame generator for generating, based on the applying, data representing the first and second image frames that animate the two-dimensional object in accordance with the gestural data collected.

In some examples, the overlay engine updates the mesh overlay for the two-dimensional object based on the collected gestural data by modifying the mesh overlay to match the modified two-dimensional object and stores the updated mesh overlay as a frame in a sequence of mesh overlays. In some examples, the set of rules include a mixed-shape deformation algorithm that combines as-rigid-as-possible animation and skeletal join system animation. In some examples, the gestural data represents distances of one or more of a palm or one or more fingers of a user relative to the gestural sensor or to each other. The gestural data includes stereoscopic imaging data represents distances of one or more of a palm or one or more fingers of a user relative to the gestural sensor and to each other. In some examples, the detected gesture includes a predetermined gesture indicative of a command to select a portion of the two-dimensional object. In some examples, the animation engine calibrates the gestural sensor to determine a pose for a user, the pose being associated with the two-dimensional object, and wherein the animation engine modifies the two-dimensional object in real-time based on detecting a change in the gestural data indicative of a changed pose for the user. In some examples, the image extraction engine isolates the two-dimensional object from other data of the image data based on adaptive thresholding, superpixel segmentation, or both. In some examples, the gestural data represents gestures performed by multiple users simultaneously. In some examples, a rendering engine renders the first and second frame images in real-time for presentation to a user.

This document describes a method including receiving gestural data from a gestural sensor; extracting image data by an image extraction engine, the image data for rendering a two-dimensional object on a display device; generating, by an overlay engine, a mesh overlay for the two-dimensional object, the mesh overlay comprising a number of selectable zones that correspond to portions of the two-dimensional object and for mapping a selectable zone to a portion of the two-dimensional object based on a detected gesture represented in the gestural data collected; applying a set of rules, by an animation engine, for to at least portion of the extracted image data that represents the portion of the two-dimensional object that is mapped to the selectable zone, the set of rules defining an amount of modification to one or more portions of the two-dimensional object from a first image frame to a second image frame based on the collected gestural data; and generating, based on the applying by an image frame generator, data representing the first and second image frames that animate the two-dimensional object in accordance with the gestural data collected.

In some examples, the actions include updating, by the mesh overlay engine, the mesh overlay for the two-dimensional object based on the collected gestural data by modifying the mesh overlay to match the modified two-dimensional object; and storing the updated mesh overlay as a frame in a sequence of mesh overlays. In some examples, the set of rules include a mixed-shape deformation algorithm that combines as-rigid-as-possible animation and skeletal join system animation. In some examples, the gestural data represents distances of one or more of a palm or one or more fingers of a user relative to the gestural sensor or to each other. In some examples, the gestural data includes stereoscopic imaging data represents distances of one or more of a palm or one or more fingers of a user relative to the gestural sensor and to each other. In some examples, the detected gesture includes a predetermined gesture indicative of a command to select a portion of the two-dimensional object. In some examples, the actions include calibrating, by the animation engine, the gestural sensor to determine a pose for a user, the pose being associated with the two-dimensional object; and modifying the two-dimensional object in real-time based on detecting a change in the gestural data indicative of a changed pose for the user. In some examples, the actions include isolating, by the image extraction engine, the two-dimensional object from other data of the image data based on adaptive thresholding, superpixel segmentation, or both. The gestural data represents gestures performed by multiple users simultaneously. In some examples, the actions include rendering, by a rendering engine, the first and second frame images in real-time for presentation to a user.

This document describes a non-transitory machine-readable medium for performing operations including receiving gestural data from a gestural sensor; extracting image data by an image extraction engine, the image data for rendering a two-dimensional object on a display device; generating, by an overlay engine, a mesh overlay for the two-dimensional object, the mesh overlay comprising a number of selectable zones that correspond to portions of the two-dimensional object and for mapping a selectable zone to a portion of the two-dimensional object based on a detected gesture represented in the gestural data collected; applying a set of rules, by an animation engine, for to at least portion of the extracted image data that represents the portion of the two-dimensional object that is mapped to the selectable zone, the set of rules defining an amount of modification to one or more portions of the two-dimensional object from a first image frame to a second image frame based on the collected gestural data; and generating, based on the applying by an image frame generator, data representing the first and second image frames that animate the two-dimensional object in accordance with the gestural data collected.

In some examples, the operations further include updating, by the mesh overlay engine, the mesh overlay for the two-dimensional object based on the collected gestural data by modifying the mesh overlay to match the modified two-dimensional object; and storing the updated mesh overlay as a frame in a sequence of mesh overlays. The set of rules include a mixed-shape deformation algorithm that combines as-rigid-as-possible animation and skeletal join system animation. In some examples, the gestural data represents distances of one or more of a palm or one or more fingers of a user relative to the gestural sensor or to each other. In some examples, the gestural data includes stereoscopic imaging data represents distances of one or more of a palm or one or more fingers of a user relative to the gestural sensor and to each other. The detected gesture includes a predetermined gesture indicative of a command to select a portion of the two-dimensional object. In some examples, the operations further include calibrating, by the animation engine, the gestural sensor to determine a pose for a user, the pose being associated with the two-dimensional object; and modifying the two-dimensional object in real-time based on detecting a change in the gestural data indicative of a changed pose for the user. In some examples, the actions include isolating, by the image extraction engine, the two-dimensional object from other data of the image data based on adaptive thresholding, superpixel segmentation, or both. In some examples, the gestural data represents gestures performed by multiple users simultaneously. The actions include rendering, by a rendering engine, the first and second frame images in real-time for presentation to a user.

Gestural rigging for real-time animation provides several advantages. The animation workflow is accomplished in real-time or near real-time. For example, the animator can view the completed animation and attempt additional takes to capture a desired nuance for a particular animated sequence. For traditional linear animation, the animator is responsible for devising and designing the intelligence and behavioral modeling of the animated two-dimensional object. Such modeling can be collaboratively accomplished by a team of writers, designers, and artists. Such modeling can require a high level of expertise. Gestural rigging for real-time, interactive animation automatically models the intelligence and behavior and enables the animator to immediate see the results of a model or animation approach. For example, motion capture driven animation, physically based animation, and live speech driven lip-sync, can be performed using gestural rigging. Gestural rigging facilitates the generation of motion graphics and game design animation and special effects, such as by providing real-time feedback. Gestural rigging enables complex animation processes to be performed using an intuitive interface. The gesture sensor system greatly reduces the time of generating animated sequences from single, still images and provides real-time feedback to users, speeding up animation workflows.

DETAILED DESCRIPTION

The gesture sensor system includes an interactive animation interface and generates animations by measuring and interpreting gestures (e.g., hand gestures) of a user. The gesture sensor system animates a two-dimensional object, such as a single still image (e.g. a photo, a drawing, etc.). The system animates the two-dimensional object by detecting gestures of the user to systematically modify (e.g., deform) the two-dimensional object in real-time in response to the detected gestures.

The gesture sensor system includes a combination of two complementary methods of shape manipulation: a "bone-joint-based" physics simulation and an "as-rigid-as-possible" deformation algorithm. The gesture sensor system introduces a number of designed interactions that focus the user's attention on the animated content, as opposed to a computer keyboard or mouse interface. The gesture sensor system provides an intuitive interface that is accessible to non-technical users, such as children. The gesture sensor system provides a quick and simple interface that enables a user to animate a two-dimensional object without using key frames.

Figure 1:
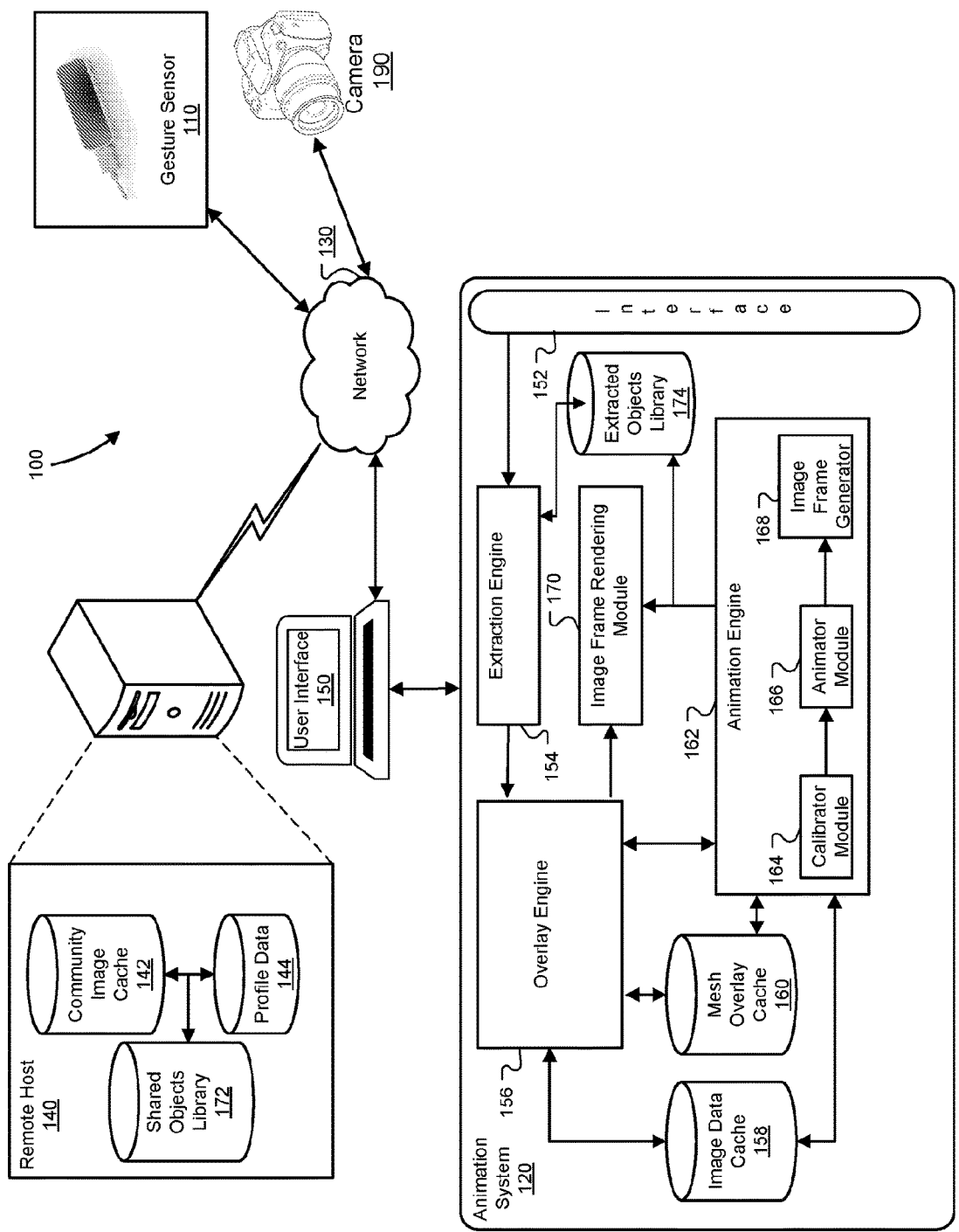
FIG. 1 shows a gesture sensor system for animating two-dimensional images using gestural data.

FIG. 1 shows a gesture sensor system 100 for animating two-dimensional images using gestural data. The gesture sensor system 100 includes a gesture sensor 110, an animation system 120, a network 130, a remote host 140, and a user interface 150.

The gesture sensor 110 measures gestures performed by a user and sends the data to the animation system 120, such as via network 130. For example, the gesture sensor 110 includes monochromatic infrared (IR) cameras and infrared light-emitting-diodes (IR LEDs) to determine ranging information for objects inside a detectable sphere of the sensor. The gesture sensor 110 maps the locations of the user and sends the gestural data to the animation system 120. In some examples, the gestural sensor sends updated data at a frame rate that is greater than the frame rate of the animation to be generated. In some examples, the gesture sensor 110 is a camera, such as stereoscopic imaging data. For example, the gesture sensor 110 detects the positions of the fingers and palms of the user for gestural animation control. For example, the gesture sensor 110 includes one of a Leap Motion controller, Microsoft Kinect, or any camera with depth sensor (e.g., a stereoscopic camera). Common among these approaches to animation is the integration of an external control system that computationally controls animated elements based on motion capture data and/or simulated physics.

In some examples, a camera 190 can be used to acquire image data. The camera 190 measures image data from the environment and send the image data to the animation system 120, such as for extraction of a two-dimensional figure by the extraction engine. For example, the camera and equipment for extracting gestures can be in the same device, e.g. a mobile phone or tablet with front-facing and rear-facing cameras. In some examples, the gesture sensor system 100 uses the Microsoft Kinect in place of the Leap Motion controller in order to extract body-scale gestural information.

The animation system 120 includes the engines and modules for animating a two-dimensional object. The animation system 120 includes an interface 152 for receiving data and sending data over the network 130. The interface 152 can include any hardware ports, buffers, etc. for the animation system 120s input/output (I/O). The interface 152 communicates with an extraction engine 154. The extraction engine 154 includes a data processor that receives the image data, such as from another system (e.g., a remote host 140), from a sensor (e.g., camera 190), or from storage (e.g., image data cache 158). For example, the image data includes raw image frames. In some examples, the image data includes processed image frames. The image data can be filtered, thresholded, and so forth. The extraction image extracts the two-dimensional object of interest from the image data as described below to prepare the two-dimensional object for animation.

The image data is stored in an image data cache 158. The image data cache 158 includes indexed storage such as disk storage, memory, and so forth. The image data can be stored and retrieved from the image data cache 158 for later use by the engines and systems of the gesture sensor system 100.

The extraction engine 154 sends the extracted image to an extracted objects library 174. The extracted objects library 174 includes an indexed storage, such as memory or disk storage. The extracted objects library 174 stores extracted two-dimensional objects for inclusion in animations or for use by other systems and engines of the gesture sensor system 100. For example, the animation system 120 can export the extracted objects from the extracted objects library 174 to a shared objects library 172 of the remote host 140 for access by other users, for access from another device, to back-up the library, and so forth.

The overlay engine 156 includes a data processor that generates mesh overlay data for the extracted two-dimensional object. The overly engine 156 sends the mesh overlay data to the animation engine 162 along with the extracted two-dimensional object for animation. The overlay engine 156 generates a mesh as described below.

The mesh overlay data can be stored in a mesh overlay cache 160. The mesh overlay cache 160 includes an indexed storage, such as disk storage or memory. The mesh overlay cache 160 stores and retrieves mesh overlay data. The mesh overlay cache 160 stores the mesh overlay data for use by the animation engine or other modules and engines of the animation system 120.

The animation engine 162 receives the mesh overlay data and the two-dimensional object and generates puppet data for animation. The puppet data includes the mesh overlay, the two-dimensional object, and the calibrated gestural mapping data that is used to transform gestural data received from the gesture sensor 110 to animation commands for the animator module 166. The animation system 120 includes a calibrator module 164. The calibrator module 164 calibrates the gesture sensor 110 as described below. The animator module 166 animates the two-dimensional object using the puppet data according to animation rules, such as those described below. The image frame generator 168 generates the animated frame, such as the adjusted (e.g., distorted) two-dimensional object.

The image frame rendering module 170 renders the frames generated by the animation engine 162 for presentation to the user via the user interface. In some examples, the animation system 120 can achieve multi-layered animation by combining several animation sequences and layering the sequences into a final, single rendered video. The image frame rendering module 170 formats the animated frames into video data formats that are useful for presentation via the user interface 150.

The user interface 150 includes a display and one or more controls for interaction with the gesture sensor system 100 by a user. The user interface can be a screen such as a computer monitor. In some examples, the user interface includes a projector. In some examples, the user interface 150 can be a life-scale display or otherwise projected display. The animation system 120 enables real-time control function at life-scale. In some examples, the user interface 150 includes a touch screen interface, such as a tablet. The user can use the touch screen interface to designate the two-dimensional object for extraction from an image, such as by highlighting (e.g., rubbing as described below), outlining, tracing, selecting, and so forth. The user interface 150 can include a mouse and keyboard interface for inputting commands and preferences for the gesture sensor system 100.

The remote host 140 includes a networked computer or server system. The remote host 140 enable users to upload and store data for accessing over the Internet, sharing with other users, and the like. The remote host stores user profile data in a profile data database 144. The remote host 140 stores shared objects, such as extracted two-dimensional objects, in a shared objects library 172. The remote host 140 stores image data in a community image cache 142.

The network 130 includes a wired or wireless network, such as the Internet, LAN, WAN, Wi-Fi, and so forth.

The animation system 120 receives a two-dimensional object as the subject of an animation to be created. The animation system 120 acquires the two-dimensional object by extracting the two-dimensional object from image data 302. The image data includes at least the two-dimensional object of interest for animation. In one example, the image data includes the two-dimensional object in addition to other image data, such as background data, other objects for animation, and so forth. In one example, the image data includes multiple layers, each having one or more objects.

The animation system 120 extracts the two-dimensional object from the image data using an extraction engine (e.g., extraction engine 154). The extraction engine performs one or more extraction algorithms for contour detection, such as to extract the two-dimensional object. The extraction engine 154 extracts the two-dimensional object for later manipulation by the animation system 120, and thus separates the two-dimensional object from a background or other portions of the image that are not intended to be animated. The extraction engine performs a foreground/background segmentation to extract the two-dimensional object from the image data when the two-dimensional object as a recognizable feature that the extraction engine can use as a basis for performing the extraction. For example, the two-dimensional object can include a person standing in front of a background, wherein the person has a distinguishable shape or color that can be used to separate the person from the background. In an example, the two-dimensional object is included in an image with a homogenous background, simplifying extraction. In such cases, the extraction engine uses adaptive thresholding to extract the two-dimensional object. For example, the two-dimensional object can be difficult to extract from the background, such as being a person in a crowd of other people, or another example wherein the object is similar to the background. For example, the extraction engine uses superpixel segmentation for extracting the two-dimensional object. In some examples, the extraction engine may prompt the user, via the display or user interface, for feedback or guidance as to what the two-dimensional object should be in the image of the image data. In some examples, the extraction engine can request that the user roughly trace the two-dimensional object in the image, select a portion of the image associated with the two-dimensional object, and so forth.

The adaptive thresholding approach being applied to the image data uses a threshold that varies when used over different portions of the image for extracting the two-dimensional object. For example, the extraction engine can use an iterative method that assumes the image data contains two classes of pixels, foreground and background, and that includes a bi-modal histogram. For example, the extraction engine splits the image into a grid of cells and applies a thresholding method (such as an iterative threshold) on each cell. When a cell cannot be thresholded well a threshold from a neighboring cell can be used. For example, the extraction engine finds a threshold for a portion of the image by statistically examining values of pixels, such as intensity values, over a local neighborhood of each pixel. Examples of such adaptive thresholding algorithms include Otsu's method, Bradley Local Thresholding, Niblack thresholding, variational minimax optimization, and so forth.

The extraction engine uses superpixel segmentation to extract the two-dimensional object from the image data. The extraction engine builds an awareness of how related the pixels of the image data are to one another to create a superpixel map that partitions the image into segments or clusters. The segments of the superpixel map include pixels that are more highly related to one another than to other pixels of the image data. For example, pixels of a superpixel segment are typically the same color, texture, intensity, and so forth. The extraction engine generates a superpixel map to reduce the complexity of the image data from a large number of pixels to a smaller number of superpixel segments. The extraction engine manipulates the superpixels for extracting the two-dimensional object.

As described above, the gesture sensor system 100, via the user interface, prompts the user for guidance for extracting the two-dimensional object for images, such as when a target two-dimensional object for extraction is not readily apparent. For example, in a complex image, many potential two-dimensional objects for animation may be present. The gesture sensor system 100 may suggest one or more two-dimensional objects of the image for extraction and prompt the user to select one or more of them. For example, if an extractible two-dimensional object is detected, the gesture sensor system 100 can render an outline around the two-dimensional object(s) enable the user to select the two-dimensional object(s). The gesture sensor system 100 enables the user to store the two-dimensional object(s) in a library, such as the extracted objects library 174 for later use in animations. In some examples, the gesture sensor system 100 prompts the user to select a portion of the image to consider a two-dimensional object for extraction. The user can trace an outline on a portion of the image, such as using a tough-screen interface, to designate the portion of the image as the two-dimensional object to be animated. For example, the user "rubs" a portion of the image to select the portion. The gesture sensor system 100 receives the input from the user interface and performs a localized extraction algorithm, such as superpixel segmentation, on the data represented by the selected portion of the image. The localized extraction performs a best guess as to which boundaries of the image the user is attempting to designate. The user "fills in" the object by the rubbing technique. If no boundary is present, the gesture sensor system 100 selects all the nearby pixels for animation. If a boundary is present, the extraction algorithm selects the pixels on a side of the boundary that are more closely related to the two-dimensional object being selected by the user. The gesture sensor system 100 performs real-time feedback of the selected portions of the image by indicating on the user interface 150 which portions have been selected by the user. For example, the gesture sensor system 100 draws a line on the detected boundary and fills in the selected object (e.g., portions of the image that have been "rubbed" by the user), such as with a highlighted color, to designate the selection. Other forms of contour detection for a two-dimensional object for animation are possible. The user can draw an outline to "cut" out the object, and the gesture sensor system 100 uses the superpixel segmentation to snap the selected boundary to a detected boundary of the image. In some examples, the user can make a selection that is not adjusted by the gesture sensor system 100. In some examples, the extraction engine 154 automatically extracts detected two-dimensional objects and exports them to the extracted objects library 174 or two other components of the animation system 120 for later use.

The overlay engine 156 of the gesture sensor system 100 generates mesh data representing a mesh which overlays the extracted two-dimensional object. The mesh includes a polygonal grid of faces and vertices, such as a triangular mesh. The faces of the mesh define zones of the image which can be mapped to portions of the image for animation as needed for one or more animation techniques described below. The geometry of the mesh depends on the resolution of the two-dimensional object and the granularity desired for animation. For example, the gesture sensor system 100 enables the user to input the resolution desired for animation, which can be limited based on processor constraints, etc. For example, a user may wish to perform a simple animation on a slow processor, and thus select a low resolution for the mesh overlay. For example, a user may wish to include more detail in the animation, and select a higher resolution.

The overlay engine detects the two-dimensional object and automatically generates a mesh based on the properties of the two-dimensional object. For example, different mesh geometries are suitable for different applications. For example, the user can select a default mesh geometry, indicate that the gesture sensor system 100 should select a "best-fit" geometry, or manually select a mesh geometry. The overlay engine generates the mesh based on boundaries detected for the of the two-dimensional object. For example, one or more mesh algorithms can be used, such as a Delaunay triangulation, a Voronoi diagram, a planar straight-line graph (PSLG), a constrained Delaunay triangulation of a PSLG, a conforming Delaunay triangulation (CDT) of a PSLG, or a constrained-conforming Delaunay triangulation (CCDT) of a PSLG. The overlay engine can use other similar mesh algorithms.

Once the mesh is generated, the overlay engine sends the mesh data to the user interface for presentation to the user. The user can see the mesh overlay on top of the two-dimensional object such that the selectable zones are on top of the portions of the two-dimensional object to which they are mapped. For example, the selectable zones are "pinned" to portions of the two-dimensional object, and as the mesh is manipulated during animation, the two-dimensional object is adjusted (e.g., deformed). The user can adjust the mesh as needed, such as via the user interface, to alter the portions of the two-dimensional object to be included in each selectable zone. The overlay engine stores the mesh overlay in a mesh overlay cache 160, such as for later use by the animation system 120.

The overlay engine designates selectable zones of the mesh by as control points for animation. The overlay engine can automatically select zones as control points based on a set of rules, such as based on the proximity of the zone to a centroid of the two-dimensional image, the size of the selectable zone, the number of vertices of the selectable zone, and so forth. The overlay engine can prompt the user to designate selectable zones as control points for animation via the user interface. The control points of the mesh serve as points that are animated using the animation techniques of the animation system 120, such as the as-rigid-as-possible shape deformation technique and the skeletal join-system animation algorithm. For example, the user can perform gestures detected by the gestural sensor for providing input for selectable zone designation.

The animation engine 162 receives the two-dimensional object and the mesh overlay data from the overlay engine 156 and animates the two-dimensional object based on gestural input from the gestural sensor. The animation engine 162 implements a mixed-shape deformation algorithm that combines as-rigid-as-possible with a skeletal join system animation approach. The animation engine 162 integrates a series of designed user interactions into the creation and real-time control of an animated puppet representing the two-dimensional object.

The animation engine 162 generates puppet data for performing animation based on the two-dimensional object and the mesh overlay data. Puppet data include the two-dimensional object data, the mesh overlay data, and associated and calibrated mapped gestural data. The puppet data include the data for the animation system 120 to animate the two-dimensional object based on gestures of the user. The calibrated mapped gestural data forms the link between the gestures performed by the user and the movement of one or more selectable zones of the mesh according to one or more animation algorithms.

The animation system 120 designates selectable zones of the mesh and assigns each selectable zone to a region of the two-dimensional object. The animation system 120 maps each selectable zone (also called an "expressive zone") to be controlled by gestures of the gestural data. As described above, the gestural sensor outputs gestural data including relative positions of a user's fingers, fingertips, palms, and so forth to the sensor. Gestures, or detected positions and movement of the gestural data, are used to move the selectable zones relative to each other and perform the animation.

The animation system 120 calibrates the gestural sensor by determining a staring pose (e.g., initial position) of the user (e.g., a user's hand or body). The starting pose indicates the resting state of the user, and the starting pose is mapped to the initial configuration of the two-dimensional object. For example, the starting pose of the gesture sensor may indicate that the user's body is standing straight. When the user leans or moves an arm, leg, etc. from the starting pose, animation system 120 recognizes the movement from the starting pose and adjusts the two-dimensional object according to the animation algorithm(s) being used.

To calibrate the gestural sensor, the calibrator module 164 of the animation system 120 determines a starting pose (e.g., resting state) for the user. The starting pose corresponds to a non-animated (e.g., non-deformed or non-adjusted) two-dimensional object as extracted from the image data by the extraction engine. The user's hand or other body parts can be used for the animation. The gesture sensor system 100 prompts the user to assume the starting pose relative to the gestural sensor. When the user is ready, the user indicates to the gestural system that the gesture sensor system 100 should take a snapshot of the starting pose. The starting pose includes the data indicative of the position of the user relative to the gestural sensor. When the user moves, such as moving a finger, the gestural sensor reports a change in the pose. The animation system 120 maps the change in pose to movement of one or more selectable zones to one another based on the animation algorithm(s) being used and the calibration of gestural movements of portions of the user to one or more selectable zones of the mesh.

To calibrate gestural movements to animation effects, the calibrator module of the animation system 120 maps one or more gestures to one or more selectable zones of the mesh. The gesture sensor system 100 prompts the user, via the user interface, to perform gestural motions for one or more of the selectable zones of the mesh so that the portion of the user is mapped to the chosen selectable zone. For example, the user is prompted to move a specific finger by pointing to a mesh vertex with a finger, and wiggling the desired control finger on the right hand. Subsequent changes in the control hand's pose animate the still image in real-time. For example, the user's entire body forms a staring pose. When a user moves a leg, a selectable zone indicated by the user is mapped to the gesture. Once the user has mapped the selectable zones to gestures as desired, the puppet generation is completed and the animation system 120 is ready to animate the generated puppet. The calibrator module 164 recognize a list of predetermined gestures indicative of one or more commands so that the calibration can be done by gestures of the user. For example, a wiggling of a finger indicates a command to select a portion of the two-dimensional object, such as for mapping the selectable zones to the two-dimensional object.

The animator module 166 of the animation system 120 receives the puppet data and determines how to animate the two-dimensional object based on the gestural data being received. The animator module animated using the animation techniques of the animation system 120, such as the as-rigid-as-possible shape deformation technique and the skeletal join-system animation algorithm. For example, when a user performs a gesture, such as moving a finger, the selectable zone mapped to the portion of the user that moved is also moved to deform the two-dimensional object. The animation rules define the amount of movement for each of the mapped selectable zones of the mesh in real-time or near-real time as the user moves and performs gestures. The animator module generates the updated mesh overlay for deforming the two-dimensional image.

The animator module sets the frame rate for calculating the deformations of the two-dimensional images dynamically based on a processing power of the animation system 120. In some examples, the user can set the frame rate to a set value.

The image frame generator 168 generates frame data representing the updated deformed two-dimensional object based on the updated mesh overlay. In some examples, such as for lower frame rates, the image frame generator generates in-between frames to smooth the animation based on known animation techniques. In some examples, the processes of the animation engine 162 can be pipelined to improve the frame rate of the animation and reduce the output latency of the animation to the image frame rendering module. In some examples, the functions of the calibrator module, the animator module, and the image frame generator are performed in parallel in the pipelined process to increase the processing speed of the animation engine 162. The image frame rendering module 170 renders the generated frame data for presentation to the user via the user interface 150.

The animation system 120 can generate animations through incremental composition to form a complex animated scene. The image frame rendering module 170 can layer multiple animations on top of one another. The image frame rendering module 170 can combine animations recorded from multiple sources for animating multiple two-dimensional objects. In some examples, the animation system 120 creates a time offset for an animation of multiple animations. As such, the animation system 120 enables collaborative puppeteering and drawing scenarios wherein two users work together to create a gesturally controlled animation. For example, each user draws a two-dimensional object and animates the two-dimensional object simultaneously using the gestural control interface described above.

Once the image frame rendering module has rendered the frame(s) for the animation, the animation system 120 sends the rendered frame(s) to the user interface for presentation to the user.

Rapid workflows are enabled by the gesture sensor system 100. In some examples, an artist draws figures and uploads the figures to the gesture sensor system 100 as image data. A puppeteer sequentially generates a pupped and animates a recorded palindrome loop for each figure drawn by the artist.

Figure 2:
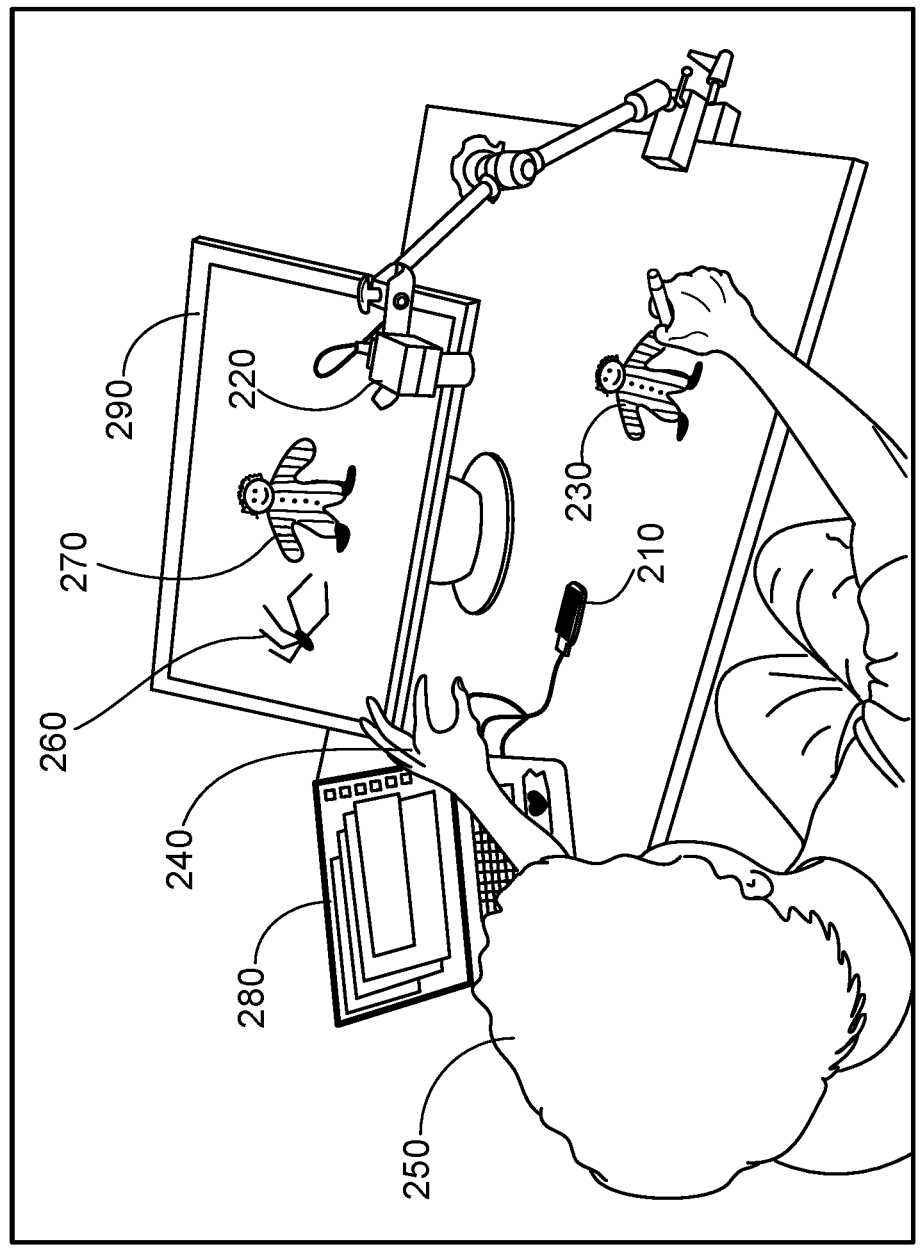
FIG. 2 shows an example gesture sensor system.

FIG. 2 shows an example gesture sensor system 200. The gesture sensor 210 receives gesture data by analyzing the movement of a hand 240 of the user 250. The camera 220 generates image data based on the image 230 drawn by the user. The image 230 is extracted from the image data of the camera to become a two-dimensional object 270. The two dimensional object is rendered on the user interface 290. In this example, the pose 260 of the user's hand 240 is displayed on the user interface 290. A client device 280 runs the animation system (e.g., animation system 120 of FIG. 1). The animation system is run using the client device 280 so that network delays are not introduced and real-time feedback is maintained. As the user 250 gestures with the hand 240, the two-dimensional image 270 adjusts (e.g., deforms) in real-time to react to the gestures detected by the gesture sensor 210, as described above.

The software implementation includes C++ using openFrameworks (http://openframeworks.cc), an open source C++ toolkit for creative coding. This environment allows developers to effectively integrate efficient generative graphics with graphical user interfaces and gestural control from an external hardware sensor (e.g., the gesture sensor).

The openFrameworks environment supports a growing list of addons (http://www.ofxaddons.com/categories) that offer additional functionality. In an embodiment of the present invention, the following addons were employed: ofxButterfly and ofxTriangleMesh (mesh generation, ofxCV (machine vision), ofxLeapMotion and ofxLeapMotionGestures (gestural control), ofxClickDownMenu (GUI) and ofxPuppet (animation).

Figure 3:
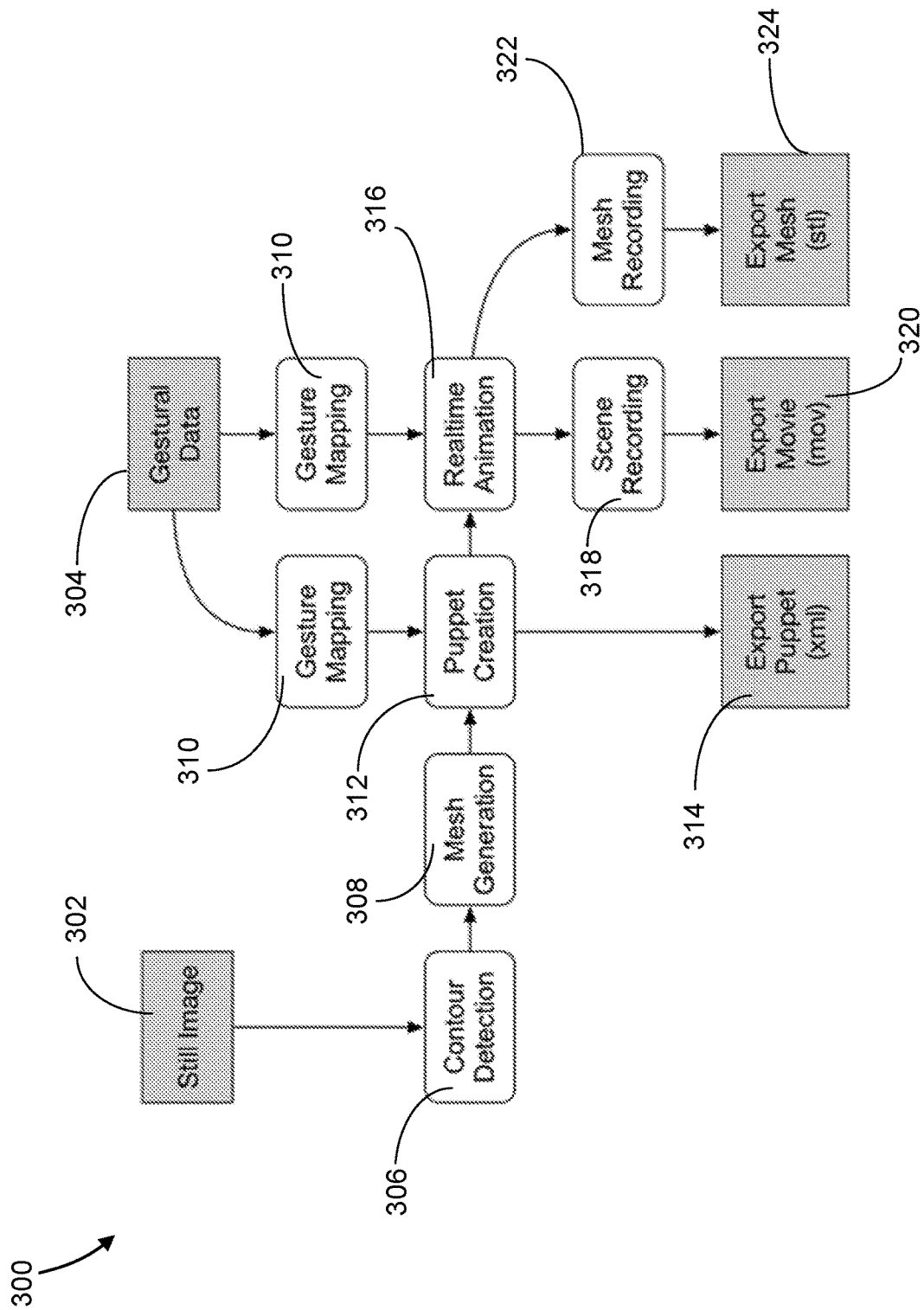
FIG. 3 shows a diagram that includes an animation process.

FIG. 3 shows a diagram that includes an animation process 300 for animating using an animation system (e.g., animation system 120) of a gesture sensor system (e.g., the gesture sensor system 100 of FIG. 1). The gesture sensor system receives inputs, such as image data 302 and gestural data 304, and processes the inputs to create one or more desired outputs, such as puppet data 314, video data 320, or mesh data 324.

The gesture sensor system performs an image extraction, such a contour detection (306), to generate a two-dimensional object. The gesture animation system generates (308) a mesh overlay for the extracted two-dimensional object. The gesture sensor system calibrates the gesture data and performs gesture mapping (310) to map gestures to zones of the mesh overlay. The gesture sensor system generates (312) puppet data using the mesh overlay, the two-dimensional object, and the gesture mapping data. The puppet can be exported (314) directly and stored, such as using a remote host (e.g., remote host 140 of FIG. 1), for later use, use in layered animations, or for sharing with other users. The gesture sensor system runs (316) the real-time animation. The gesture sensor system records the scene (318) and exports (320) the movie, such as for presentation or for later use in layered animation or by other users. The mesh overlay is recorded (322) and can be exported (324) for storage or later use.

Figure 4:
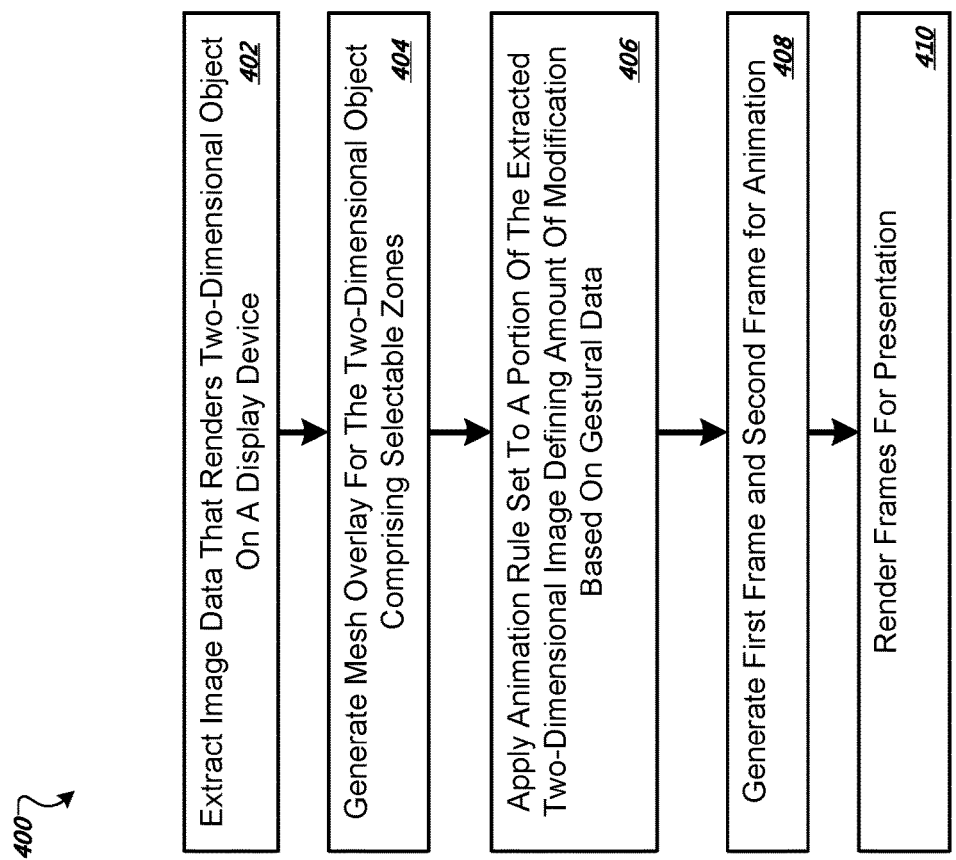
FIG. 4 shows an example process for real-time animation of image data using the gesture sensor system.

FIG. 4 shows an example process 400 for real-time animation of image data using the gesture sensor system. The gesture sensor system extracts (402) the image data that renders two-dimensional object on a display device. The gesture sensor system generates (404) a mesh overlay for the two-dimensional object comprising selectable zones. The gesture sensor system applies (406) an animation rule set to a portion of the extracted two-dimensional image defining amount of modification based on gestural data. The gesture sensor system generates (408) a first frame and second frame for animation. The gesture sensor system renders (410) frames for presentation.

Figure 5:
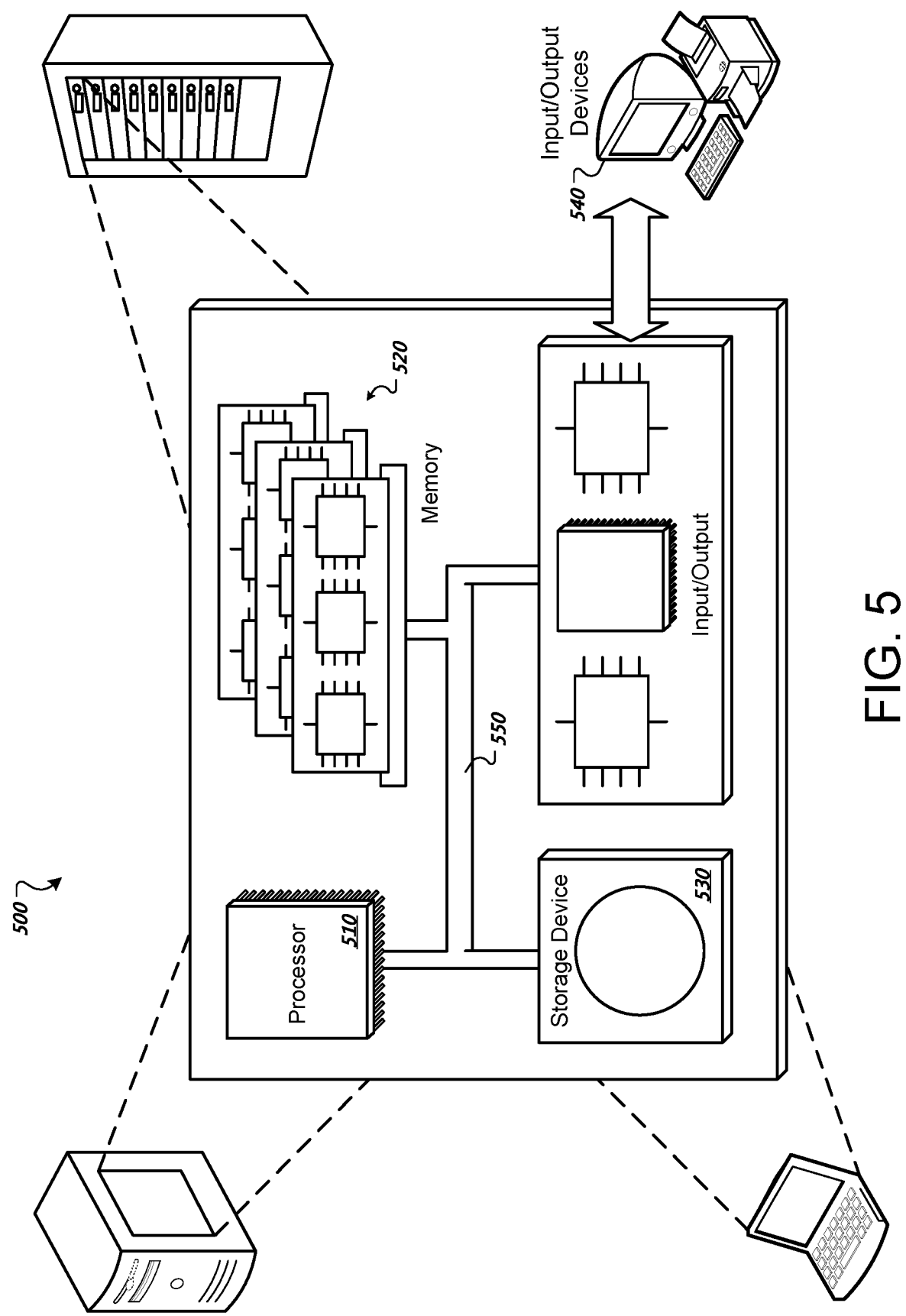
FIG. 5 is a schematic diagram of a computing engine of the gestural sensor system.

FIG. 5 is a schematic diagram of a computing engine 500 of the gestural sensor system. The engine 500 is used for the operations described in association with any of the computer-implement methods described previously, according to one implementation. The engine 500 is intended to include various forms of digital computers, such as laptops, desktops, workstations, personal digital assistants, servers, blade servers, mainframes, and other appropriate computers. The engine 500 also includes mobile devices, such as personal digital assistants, cellular telephones, smartphones, and other similar computing devices. Additionally, the system includes portable storage media, such as, Universal Serial Bus (USB) flash drives. For example, the USB flash drives may store operating systems and other applications. The USB flash drives include input/output components, such as a wireless transmitter or USB connector that may be inserted into a USB port of another computing device.

The engine 500 includes a processor 510, a memory 520, a storage device 530, and an input/output device 540. Each of the components 510, 520, 530, and 540 are interconnected using a system bus 550. The processor 510 is capable of processing instructions for execution within the engine 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the engine 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the engine 500. In one implementation, the storage device 530 is a computer-readable medium. In various different implementations, the storage device 530 may be a floppy disk device, a hard disk device, an optical disk device, or a tape device.

The input/output device 540 provides input/output operations for the engine 500. In one implementation, the input/output device 540 includes a keyboard and/or pointing device. In another implementation, the input/output device 540 includes a display unit for displaying graphical user interfaces.

The features described is implemented in digital electronic circuitry, or in computer hardware, firmware, software, or in combinations of them. The apparatus is implemented in a computer program product tangibly embodied in an information carrier, e.g., in a machine-readable storage device for execution by a programmable processor; and method steps is performed by a programmable processor executing a program of instructions to perform functions of the described implementations by operating on input data and generating output. The described features are implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that is used, directly or indirectly, in a computer to perform a certain activity or bring about a certain result. A computer program is written in any form of programming language, including compiled or interpreted languages, and it is deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory is supplemented by, or incorporated in, ASICs (application-specific integrated circuits).

To provide for interaction with a user, the features is implemented on a computer having a display device such as a CRT (cathode ray tube) or LCD (liquid crystal display) monitor for displaying information to the user and a keyboard and a pointing device such as a mouse or a trackball by which the user provides input to the computer.

The features are implemented in a computer system that includes a back-end component, such as a data server, or that includes a middleware component, such as an application server or an Internet server, or that includes a front-end component, such as a client computer having a graphical user interface or an Internet browser, or any combination of them. The components of the system are connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system includes clients and servers. A client and server are generally remote from each other and typically interact through a network, such as the described one. The relationship of client and server arises by virtue of computer programs running on the respective computers and having a client-server relationship to each other.

This system exploits a range of software, hardware and interaction designs to render the creation of gesturally controlled animated characters easy, fast and intuitive. In addition to obvious applications within animation and special effects, this approach to intuitive real-time animation has application within education, storytelling, information visualization and participatory art installations and performance.

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of exemplary embodiments of the invention have been described. Nevertheless, it will be understood by one of ordinary skill in the art that various modifications may be made without departing from the spirit and scope of the techniques described herein.

What is claimed is:

1. A system for automatically animating a two-dimensional object in real-time with gestural data collected by a gestural sensor of the system, comprising:
   a gestural sensor that collects gestural data;
   an image extraction engine for extracting image data that renders a two-dimensional object on a display device of the system;
   an overlay engine for generating a mesh overlay for the two-dimensional object, the mesh overlay comprising a number of selectable zones that correspond to portions of the two-dimensional object and for mapping a selectable zone to a portion of the two-dimensional object based on a detected gesture represented in the gestural data collected, wherein the detected gesture comprises a predetermined gesture indicative of a command to select the selectable zone of the two-dimensional object;
   an animation engine for applying a set of rules to at least portion of the extracted image data that represents the portion of the two-dimensional object that is mapped to the selectable zone, the set of rules defining an amount of modification to one or more portions of the two-dimensional object from a first image frame to a second image frame based on the collected gestural data; and
   an image frame generator for generating, based on the applying, data representing the first and second image frames that animate the two-dimensional object in accordance with the gestural data collected.

2. The system of claim 1, wherein the overlay engine updates the mesh overlay for the two-dimensional object based on the collected gestural data by modifying the mesh overlay to match the modified two-dimensional object and stores the updated mesh overlay as a frame in a sequence of mesh overlays.

3. The system of claim 1, wherein the set of rules comprise a mixed-shape deformation algorithm that combines as-rigid-as-possible animation and skeletal join system animation.

4. The system of claim 1, wherein the gestural data represents distances of one or more of a palm or one or more fingers of a user relative to the gestural sensor or to each other.

5. The system of claim 1, wherein the gestural data comprises stereoscopic imaging data represents distances of one or more of a palm or one or more fingers of a user relative to the gestural sensor and to each other.

6. The system of claim 1, wherein the animation engine calibrates the gestural sensor to determine a pose for a user, the pose being associated with the two-dimensional object, and wherein the animation engine modifies the two-dimensional object in real-time based on detecting a change in the gestural data indicative of a changed pose for the user.

7. The system of claim 1, wherein the image extraction engine isolates the two-dimensional object from other data of the image data based on adaptive thresholding, superpixel segmentation, or both.

8. The system of claim 1, wherein the gestural data represents gestures performed by multiple users simultaneously.

9. The system of claim 1, further comprising a rendering engine for rendering the first and second frame images in real-time for presentation to a user.

10. A method for automatically animating a two-dimensional object in real-time with gestural data collected by a gestural sensor of the system, the method comprising:
    receiving gestural data from a gestural sensor;
    extracting image data by an image extraction engine, the image data for rendering a two-dimensional object on a display device;
    detecting, in the gestural data, a gesture comprising a predetermined gesture indicative of a command to select a selectable zone of the two-dimensional object
    generating, by an overlay engine, a mesh overlay for the two-dimensional object, the mesh overlay comprising a number of selectable zones, including the selectable zone, that correspond to portions of the two-dimensional object;
    mapping the selected selectable zone to a portion of the two-dimensional object based on the detected gesture;
    applying a set of rules, by an animation engine, for to at least portion of the extracted image data that represents the portion of the two-dimensional object that is mapped to the selectable zone, the set of rules defining an amount of modification to one or more portions of the two-dimensional object from a first image frame to a second image frame based on the collected gestural data; and
    generating, based on the applying by an image frame generator, data representing the first and second image frames that animate the two-dimensional object in accordance with the gestural data collected.

11. The method of claim 10, further comprising:
    updating, by the mesh overlay engine, the mesh overlay for the two-dimensional object based on the collected gestural data by modifying the mesh overlay to match the modified two-dimensional object; and
    storing the updated mesh overlay as a frame in a sequence of mesh overlays.

12. The method of claim 10, wherein the set of rules comprise a mixed-shape deformation algorithm that combines as-rigid-as-possible animation and skeletal join system animation.

13. The method of claim 10, wherein the gestural data represents distances of one or more of a palm or one or more fingers of a user relative to the gestural sensor or to each other.

14. The method of claim 10, wherein the gestural data comprises stereoscopic imaging data represents distances of one or more of a palm or one or more fingers of a user relative to the gestural sensor and to each other.

15. The method of claim 10, further comprising:
    calibrating, by the animation engine, the gestural sensor to determine a pose for a user, the pose being associated with the two-dimensional object; and
    modifying the two-dimensional object in real-time based on detecting a change in the gestural data indicative of a changed pose for the user.

16. The method of claim 10, further comprising:
    isolating, by the image extraction engine, the two-dimensional object from other data of the image data based on adaptive thresholding, superpixel segmentation, or both.

17. The method of claim 10, wherein the gestural data represents gestures performed by multiple users simultaneously.

18. The method of claim 10, further comprising:
    rendering, by a rendering engine, the first and second frame images in real-time for presentation to a user.

19. A non-transitory machine readable medium storing instructions for performing operations for automatically animating a two-dimensional object in real-time with gestural data collected by a gestural sensor of the system, the operations comprising:

receiving gestural data from a gestural sensor;

extracting image data by an image extraction engine, the image data for rendering a two-dimensional object on a display device;

detecting, in the gestural data, a gesture comprising a predetermined gesture indicative of a command to select a selectable zone of the two-dimensional object;

generating, by an overlay engine, a mesh overlay for the two-dimensional object, the mesh overlay comprising a number of selectable zones, including the selectable zone, that correspond to portions of the two-dimensional object;

mapping the selected selectable zone to a portion of the two-dimensional object based on the detected gesture;

applying a set of rules, by an animation engine, for to at least portion of the extracted image data that represents the portion of the two-dimensional object that is mapped to the selectable zone, the set of rules defining an amount of modification to one or more portions of the two-dimensional object from a first image frame to a second image frame based on the collected gestural data; and generating, based on the applying by an image frame generator, data representing the first and second image frames that animate the two-dimensional object in accordance with the gestural data collected.

20. The non-transitory machine readable medium of claim 19, wherein the operations further comprise:

updating, by the mesh overlay engine, the mesh overlay for the two-dimensional object based on the collected gestural data by modifying the mesh overlay to match the modified two-dimensional object; and storing the updated mesh overlay as a frame in a sequence of mesh overlays.

21. The non-transitory machine readable medium of claim 19, wherein the set of rules comprise a mixed-shape deformation algorithm that combines as-rigid-as-possible animation and skeletal join system animation.

22. The non-transitory machine readable medium of claim 19, wherein the gestural data represents distances of one or more of a palm or one or more fingers of a user relative to the gestural sensor or to each other.

23. The non-transitory machine readable medium of claim 19, wherein the gestural data comprises stereoscopic imaging data represents distances of one or more of a palm or one or more fingers of a user relative to the gestural sensor and to each other.

24. The non-transitory machine readable medium of claim 19, wherein the operations further comprise:

calibrating, by the animation engine, the gestural sensor to determine a pose for a user, the pose being associated with the two-dimensional object; and modifying the two-dimensional object in real-time based on detecting a change in the gestural data indicative of a changed pose for the user.

25. The method of claim 19, further comprising:

isolating, by the image extraction engine, the two-dimensional object from other data of the image data based on adaptive thresholding, superpixel segmentation, or both.

26. The method of claim 19, wherein the gestural data represents gestures performed by multiple users simultaneously.

27. The method of claim 19, further comprising:

rendering, by a rendering engine, the first and second frame images in real-time for presentation to a user.

* * * * *